United States Patent
Karrasch et al.

(10) Patent No.: US 12,244,913 B2
(45) Date of Patent: Mar. 4, 2025

(54) CONNECTION DEVICE FOR AN ELECTRIC AND/OR ELECTRONIC APPLIANCE WITH AN APPLIANCE HOUSING, AS WELL AS APPLIANCE HOUSING ASSEMBLY AND SENSOR ASSEMBLY

(71) Applicant: TE Connectivity Germany GmbH, Bensheim (DE)

(72) Inventors: Gregor Karrasch, Bensheim (DE); Anne Weiss, Bensheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 513 days.

(21) Appl. No.: 17/669,795

(22) Filed: Feb. 11, 2022

(65) Prior Publication Data

US 2022/0250548 A1    Aug. 11, 2022

(30) Foreign Application Priority Data

Feb. 11, 2021   (DE) .......................... 102021103232.6

(51) Int. Cl.
*H04N 23/51* (2023.01)
*H01R 12/71* (2011.01)
(Continued)

(52) U.S. Cl.
CPC .......... *H04N 23/51* (2023.01); *H01R 12/716* (2013.01); *H01R 13/5202* (2013.01); *H01R 13/74* (2013.01)

(58) Field of Classification Search
CPC .. H01R 12/716; H01R 13/5202; H01R 13/74; H01R 24/52; H01R 13/502; H01R 13/40; H01R 13/516
See application file for complete search history.

(56) References Cited

U.S. PATENT DOCUMENTS 8,905,784 B2 * 12/2014 Perotto .............. H01R 13/5202
                                                              439/587
9,337,567 B2 *  5/2016 Rangi ................ H01R 13/5202
(Continued)

FOREIGN PATENT DOCUMENTS

DE            29710984 U1    10/1997
DE        102015100276 A1     7/2016

OTHER PUBLICATIONS

German Office Action, App No. 10 2021 103 232.6, dated Oct. 8, 2021, 4 pages.

*Primary Examiner* — Edwin A. Leon
(74) *Attorney, Agent, or Firm* — Barley Snyder (57) ABSTRACT

A connection device for an appliance with an appliance housing includes a main body having an appliance-side end, a connection-side end facing away from the appliance-side end, and a conduit extending from the appliance-side end to the connection-side end, a securing element securing the main body to a wall section of the appliance housing, and a conductor leading through the main body from the connection-side end to the appliance-side end. The main body has a first abutment surface facing the appliance-side end. The securing element has a second abutment surface facing the first abutment surface. The first abutment surface and the second abutment surface enclose therebetween a receiving region for clamping reception of the wall section of the appliance housing.

17 Claims, 6 Drawing Sheets

(51) Int. Cl.
*H01R 13/52* (2006.01)
*H01R 13/74* (2006.01)

(56) References Cited

U.S. PATENT DOCUMENTS

| | | |
|---|---|---|
| 9,960,531 B2 * | 5/2018 | Poncini .............. H01R 13/6625 |
| 10,158,799 B2 | 12/2018 | Eguchi et al. |
| 10,205,285 B2 * | 2/2019 | Sasaki .................... H04N 23/57 |
| 10,965,056 B2 * | 3/2021 | Siddiqui .............. H01R 13/521 |
| 2013/0203284 A1 | 8/2013 | Perotto et al. |
| 2014/0151118 A1 | 6/2014 | Han et al. |
| 2017/0155809 A1 | 6/2017 | Sauer et al. |
| 2017/0310863 A1 | 10/2017 | Wohlte |
| 2018/0006407 A1 | 1/2018 | Sasaki |

* cited by examiner

Fig. 8

CONNECTION DEVICE FOR AN ELECTRIC AND/OR ELECTRONIC APPLIANCE WITH AN APPLIANCE HOUSING, AS WELL AS APPLIANCE HOUSING ASSEMBLY AND SENSOR ASSEMBLY

CROSS-REFERENCE TO RELATED APPLICATIONS

This application claims the benefit of the filing date under 35 U.S.C. § 119(a)-(d) of German Patent Application No. 102021103232.6, filed on Feb. 11, 2021.

FIELD OF THE INVENTION

The present invention relates to a connection device and, more particularly, to a connection device for connecting a cable or a connector to an electric and/or electronic appliance having an appliance housing.

BACKGROUND

In many fields of industry, appliance manufacturers and system suppliers process, combine and install components provided by their suppliers in their electric and/or electronic appliances. The principle here is to minimize the effort involved in assembling the supplied components and installing the finished electric and/or electronic appliances.

To protect against external influences, appliance housings are often used for electric and/or electronic appliances. This often requires a connection for signal transmission and/or power supply to the outside or inside of the appliance housing. The installation of such connections on the appliance housing should be as simple as possible. Thus, the problem underlying the present invention is to provide a connection device that is easy to assemble.

SUMMARY

A connection device for an appliance with an appliance housing includes a main body having an appliance-side end, a connection-side end facing away from the appliance-side end, and a conduit extending from the appliance-side end to the connection-side end, a securing element securing the main body to a wall section of the appliance housing, and a conductor leading through the main body from the connection-side end to the appliance-side end. The main body has a first abutment surface facing the appliance-side end. The securing element has a second abutment surface facing the first abutment surface. The first abutment surface and the second abutment surface enclose therebetween a receiving region for clamping reception of the wall section of the appliance housing.

BRIEF DESCRIPTION OF THE DRAWINGS

The invention will now be described by way of example with reference to the accompanying Figures, of which.

DETAILED DESCRIPTION OF THE EMBODIMENT(S)

In the following, the invention is explained in more detail with reference to the drawings by means of several embodiments, the various features of which can be arbitrarily combined with one another.

First, the schematic structure of a connection device 1 according to the invention is explained with reference to FIGS. 1 to 4. Then, the schematic structure of an appliance housing assembly 2 according to the invention is explained with reference to FIGS. 2 and 8, and the schematic structure of a sensor assembly 4 according to the invention is explained with reference to FIG. 3. In addition, an insertion process of a connection device 1 according to the invention is briefly described with reference to FIGS. 5 to 7.

In the following, the term "appliance" refers to an electric and/or electronic appliance, such as a sensor, for example an automotive sensor, in particular a rearview mirror camera. However, the applicability of the present invention is not limited to rearview mirror cameras, but can be extended to any electric and/or electronic appliance having an appliance housing. For example, the present invention can also be applied to any other type of camera in a motor vehicle, as well as to accelerometers and any other automotive sensors, provided that they can be installed or are installed in a housing (e.g., sensor housing).

Figure 1:
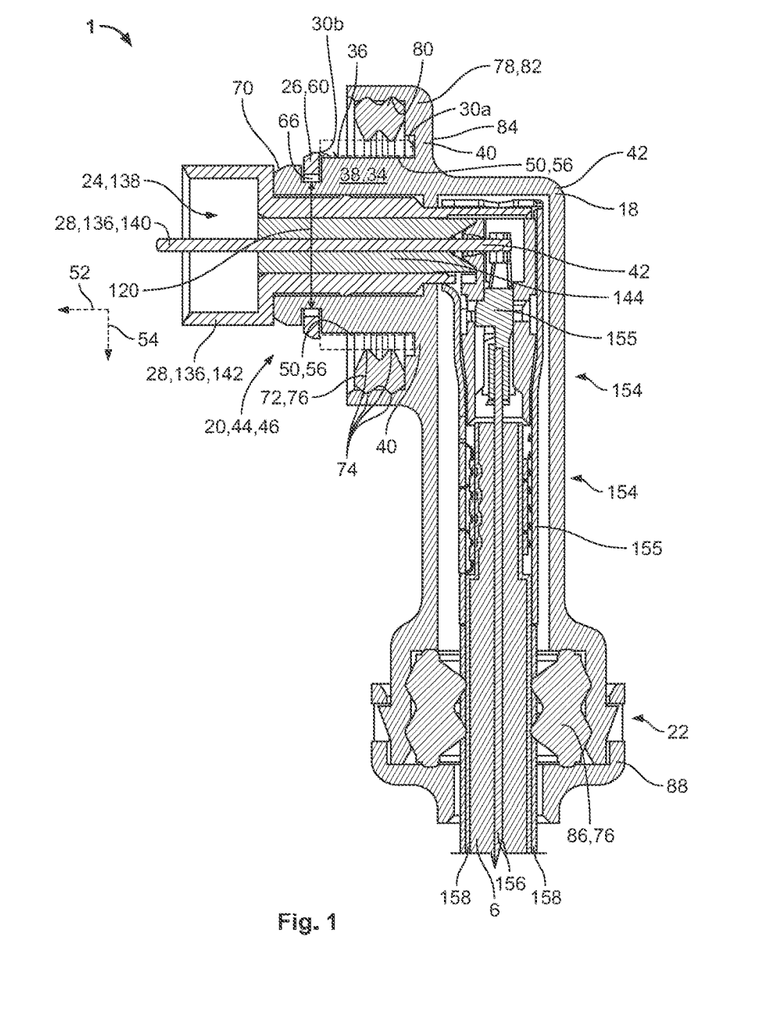
FIG. 1 is a sectional side view of a connection device according to an embodiment.

An exemplary embodiment of the connection device 1 according to the invention is shown in FIG. 1. The connection device 1 serves to connect a cable 6 or a plug connector to an appliance 8 (see FIG. 3) with an appliance housing 10. The connection device 1 can be part of the appliance housing assembly 2 according to the invention shown in FIG. 2 or 8, which in addition to the connection device 1 also comprises at least one housing part 12 of the above appliance housing 10, optionally the entire appliance housing 10 in which the appliance 8 can be installed. The appliance housing assembly 2 can in turn be part of the sensor assembly 4 according to the invention shown in FIG. 3, which in addition to the appliance housing assembly 2 comprises a sensor 14 with at least one circuit board 16.

As shown in FIG. 1, the connection device 1 comprises a main body 18 with an appliance-side end 20, a connection-side end 22 facing away from the appliance-side end 20, and a conduit 24 extending from the appliance-side end 20 to the connection-side end 22. Depending on the type of appliance, the appliance-side end 20 of the main body 18 may be a sensor-side end and/or a camera-side end. Furthermore, the connection device 1 according to the invention comprises a securing element 26 and at least one conductor 28 leading through the main body 18 from the connection-side end 22 to the appliance-side end 20.

The at least one conductor 28 can be an electrical conductor as well as an optical conductor. In the following, mainly embodiments with electrical conductors will be discussed. However, embodiments with optical conductors are not to be excluded and are also covered by the present invention.

The main body 18 can be an injection-molded part, for example made of polyamide, polybutylene terephthalate (PBT) or other plastics. The main body 18 has a first abutment surface 30a facing its appliance-side end 20. Furthermore, the main body 18 may have an outer contour 32 that is rotationally symmetrical, at least in sections. In the embodiment shown in FIG. 2, the main body 18 has at least one section 34 with a cylindrical outer surface 36 between the appliance-side end 20 and the connection-side end 22. As an alternative to the cylindrical outer surface 36, the corresponding section 34 of the main body 18 may also have a differently shaped rotationally symmetrical outer surface.

Figure 2:
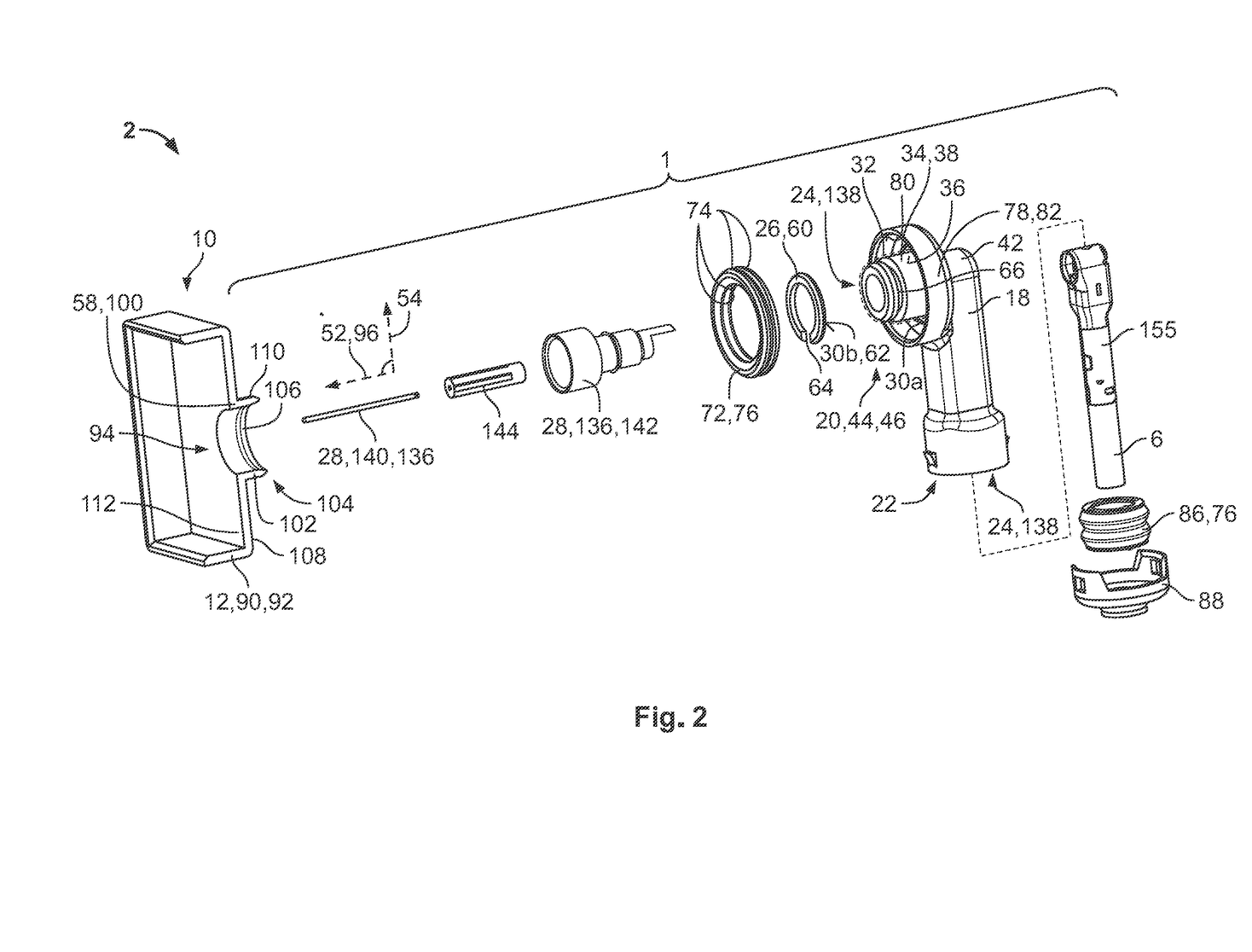
FIG. 2 is an exploded perspective view of an appliance housing assembly according to an embodiment.

The main body 18 may have a central projection 38 forming the conduit 24 at least at the appliance-side end 20, as shown in FIG. 2. The section 34 having a cylindrical outer surface 36 may be formed on this central projection 38. Furthermore, the first abutment surface 30a may be formed on a circumferential shoulder 40 of the main body 18 projecting radially from the central projection 38.

There may be an angular offset of 90° between the appliance-side end 20 of the main body 18 and the connection-side end 22 of the main body 18. In particular, the main body 18 as well as the at least one conductor 28 between the appliance-side end 20 and the connection-side end 22 of the main body 18 can each have a curvature 42 or multiple curvatures of 90° in total. The section 34 of the main body 18 with cylindrical outer surface 36 is, in an embodiment, located between the curvature 42 and the appliance-side end 20. A connection device angled in such a way occupies a comparatively small installation depth in the immediate vicinity of the appliance and is thus space-saving. Depending on the application, the angular offset between the appliance-side end 20 and the connection-side end 22 can also have any value between 90° and 180°, such as 135°.

Figure 3:
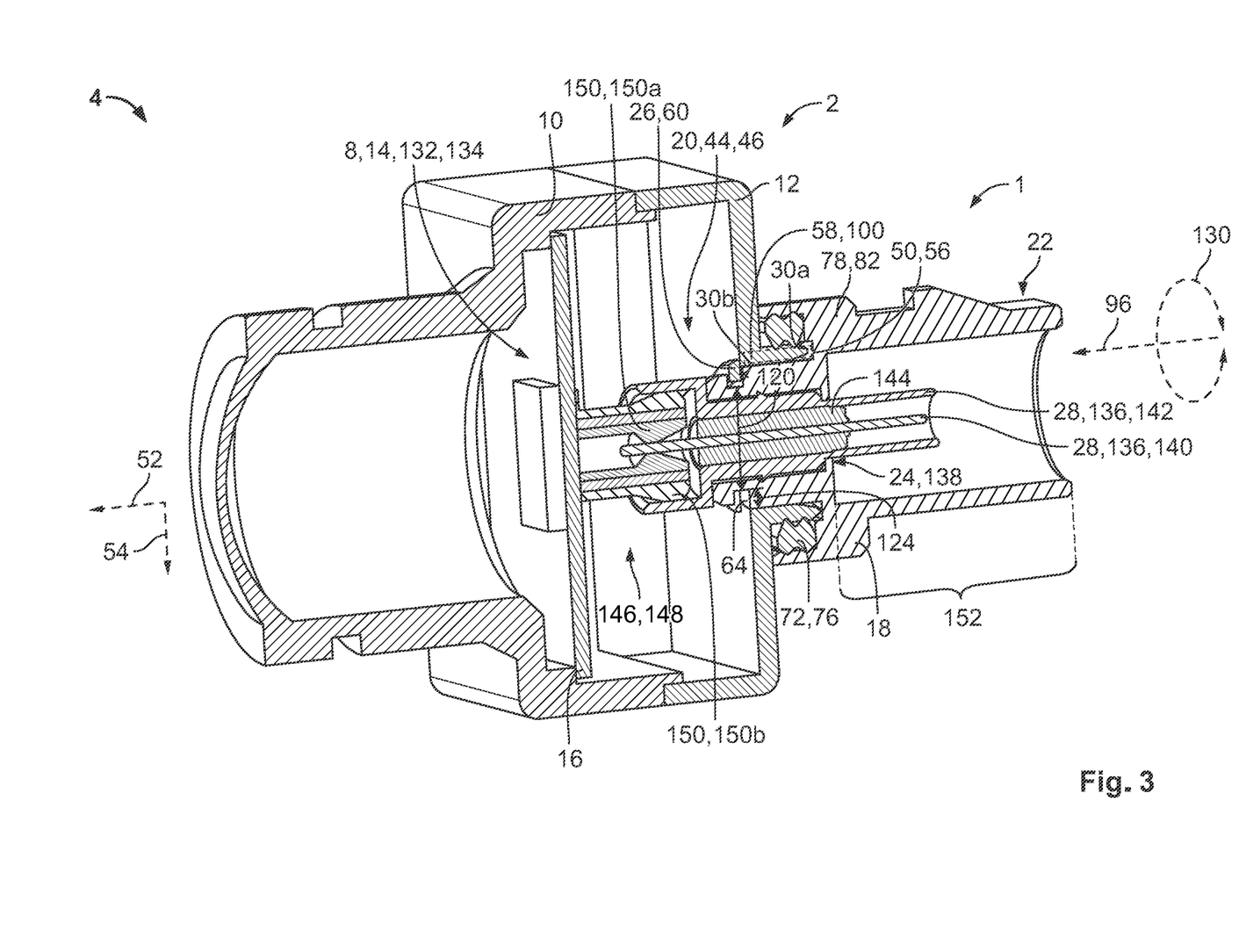
FIG. 3 is a sectional perspective view of a sensor assembly according to an embodiment.
Figure 8:
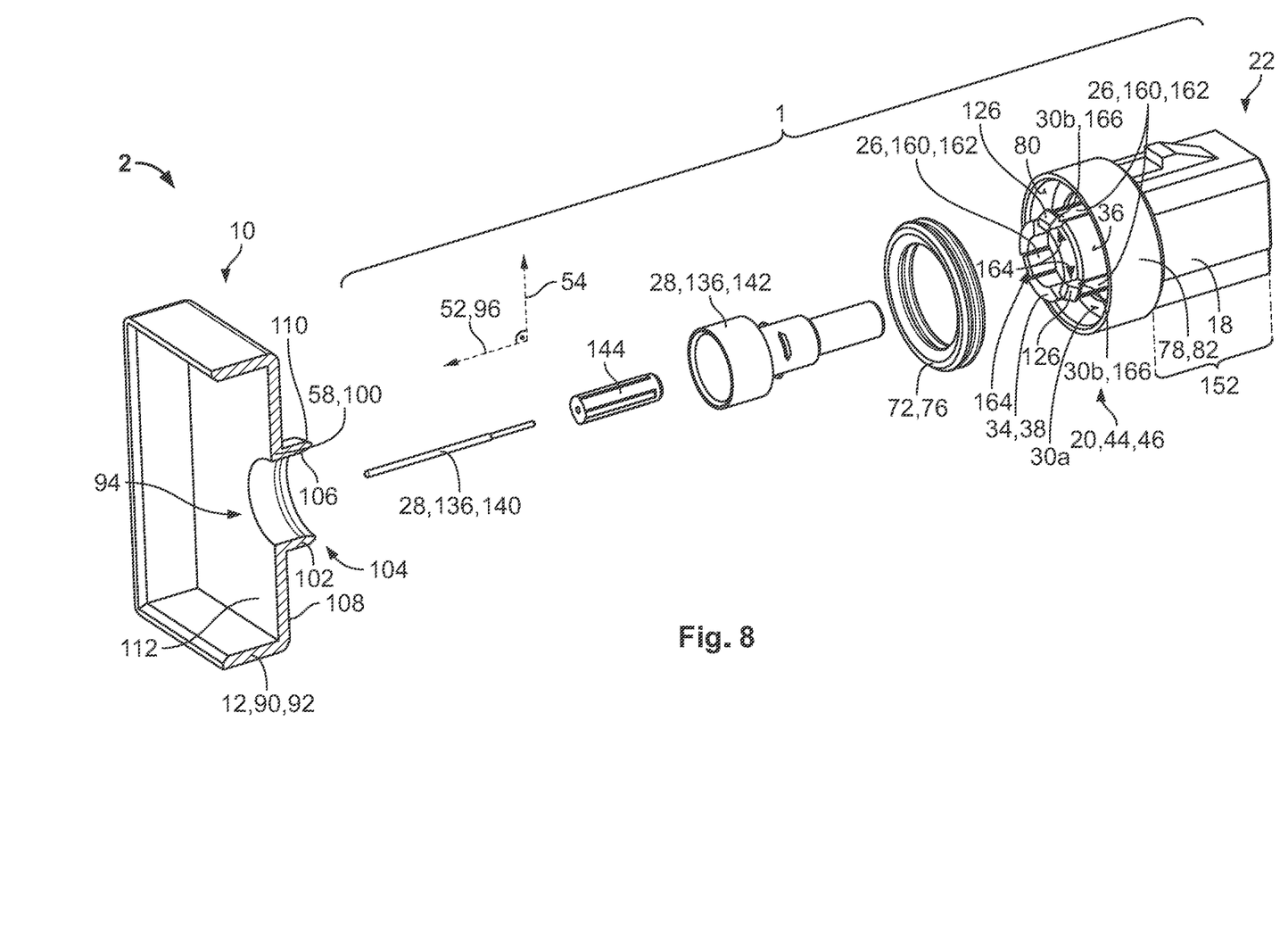
FIG. 8 is an exploded perspective view of an appliance housing assembly according to another embodiment.

Alternatively, the main body 18 as well as the at least one conductor 28 can be designed without curvature, i.e. with an angular offset between the appliance-side end 20 and the connection-side end 22 of 180° (see FIG. 3 or 8). The angular offset between the appliance-side end 20 and the connection-side end 22 can also be any value between 90° and 180°, depending on the application.

In FIGS. 1 to 7, the securing element 26 is configured to be attached to the main body 18. The securing element 26 mounted on the main body 18 has a second abutment surface 30b facing the first abutment surface 30a, wherein the first abutment surface 30a and the second abutment surface 30b enclose a receiving region 50 between them.

As shown in FIG. 1, the first abutment surface 30a and the second abutment surface 30b can be configured to be planar or flat. Furthermore, the first abutment surface 30a and the second abutment surface 30b can be continuously or at least partially configured in an annular shape. In addition, the first abutment surface 30a and the second abutment surface 30b can run parallel to one another. Furthermore, the first abutment surface 30a and the second abutment surface 30b can be opposite one another in the axial direction 52. Alternatively, the first abutment surface 30a and the second abutment surface 30b can be offset from one another in the radial direction 54. In this case, the axial direction 52 and the radial direction 54 each refer to the cylindrical outer surface 36 of the section 34 of the main body 18.

The receiving region 50 can circumferentially surround the cylindrical outer surface 36 of the section 34 of the main body 18. In particular, the receiving region 50 can be straight and, in an embodiment, configured in an annular shape. For this purpose, the cylindrical outer surface 36 of the section 34 of the main body 18 can adjoin the first abutment surface 30a and the second abutment surface 30b, respectively. Thus, the first abutment surface 30a, the second abutment surface 30b and the cylindrical outer surface 36 can together form a circumferential receiving groove 56 that coincides with the receiving region 50. This is shown in FIG. 1.

The receiving region 50 serves to receive a wall section 58 (see FIG. 3) of the appliance housing 10 in a clamping manner. In other words, the wall section 58 can be clamped, enclosed, wedged, or otherwise form-fittingly and/or force-lockingly received between the first abutment surface 30a and the second abutment surface 30b.

Figure 4:
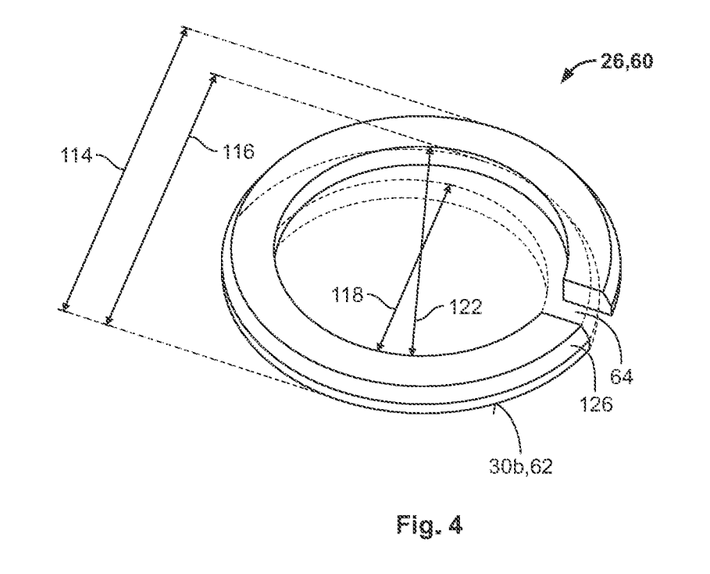
FIG. 4 is a perspective view of a securing element of the connection device.

Consequently, the securing element 26 serves to secure the main body 18 axially on the wall section 58 of the appliance housing 10 and fixes the connection device 1 to the appliance housing 10. For this purpose, the securing element 26 can be configured, for example, as shown in FIG. 4, as a flat securing ring 60 and made, for example, of polyamide or also spring steel. Here, an end face 62 of the securing ring 60 can form the second abutment surface 30b. Furthermore, the securing ring 60 can have a ring gap 64. The securing element 26 can be a simple snap ring, a U-shaped snap ring, a double snap ring, a triangular snap ring, a retaining ring, a clasp, a lock washer or some other spreading part. These can be manufactured or obtained inexpensively.

The securing ring 60 may be attached to the appliance-side end 20 of the main body 18, as shown in FIG. 1. In particular, the securing ring 60 can be placed in a circumferential annular groove 66 formed on the cylindrical outer surface 36 of the main body 18. In an embodiment, the securing ring 60 is spread into the circumferential annular groove 66 for this purpose and has the geometry and material property necessary for this purpose in order to withstand expansion up to an inner diameter which corresponds to the outer diameter 68 of the section 34 with cylindrical outer surface 36 of the main body 18 without undergoing plastic deformation. In order to facilitate the spreading of the securing ring 60, the main body 18 can have a circumferential bevel 70 at its appliance-side end 20. The securing ring 60 can be deformed, joined and then released in the course of its attachment to the main body 18. In an embodiment, the securing ring 60 releases automatically in the force-free state. In order to facilitate spreading of the securing ring 60, the main body 18 can optionally have a circumferential chamfer at the appliance-side end 20 adjacent to the section with the cylindrical outer surface 36.

The connection device 1 may optionally include at least one annular sealing element 72 with radially inward and/or outward facing circumferential sealing lips 74, as shown in FIG. 1, in order to protect against the entry of moisture, dust and/or other contamination. The at least one sealing element 72 can, for example, be a separate double-lamellar sealing ring 76 made of silicone. Alternatively, the at least one sealing element 72 may form a two-component injection molded component together with the main body 18.

The at least one sealing element 72 may be in contact with the main body 18. In particular, as shown in FIGS. 1 and 3, the at least one sealing element 72 can be arranged in a pot-shaped sealing receptacle 78 of the main body 18 and rest on an inner surface 80 of the pot-shaped sealing receptacle 78. In this case, the pot-shaped sealing receptacle 78 can be formed by a ring-shaped collar 82 formed on the central projection 38 of the main body 18, which collar surrounds the at least one sealing element 72 in the axial direction 52 on a side 84 facing away from the appliance-side end 20 and in the radial direction 54. In an embodiment, the pot-shaped sealing receptacle 78 is open only towards the appliance-side end 20 and protects the at least one sealing element 72, for example, from directed water jets from all remaining spatial directions The at least one sealing element 72 arranged in the sealing receptacle 78 may project into the receiving region 50 or at least be adjacent to the receiving region 50. In particular, at least one of the sealing lips 74 can project into the receiving region 50 and form a sealing connection with the wall section 58 of the appliance housing 10. Alternatively or additionally, the at least one sealing element 72 can also rest on the first abutment surface 30a, on the second abutment surface 30b and/or on the cylindrical outer surface 36.

As shown in FIG. 1, the connection device 1 may comprise at least one further sealing element 86, which is received in a seal protection cap 88 arranged at the connection-side end 22 of the main body 18. The sealing protection cap 88 also provides protection against directed water jets so that there the at least one further sealing element 86 reliably seals a gap between the main body 18 and the cable 6 or connector. The at least one further sealing element 86 can form a two-component injection-molded component together with the sealing protection cap 88. Alternatively, the at least one further sealing element 86 can be a separate sealing ring, for example a double lamellar sealing ring made of silicone or a silicone-containing material. As an alternative or addition to sealing elements, sealing compound can also be used for sealing.

The appliance housing assembly 2 according to the invention mentioned above is described below. Optionally, in addition to the housing part 12, the appliance housing assembly 2 also includes the remaining appliance housing 10 and thus the entire appliance housing 10.

The housing part 12 of the appliance housing assembly 2 may be, for example, a housing cover 90 or a housing wall segment 92 made of plastic or of aluminum, tin or other metallic materials, which is welded, glued, screwed and/or latched to the remaining appliance housing during the course of appliance manufacture.

As shown in FIG. 2, the housing part 12 has a circular through-opening 94 in an embodiment, into which the connection device 1 can be at least partially inserted along an insertion direction 96. The insertion direction 96 is parallel to the axial direction 52 in the shown embodiment. The appliance-side end 20 of the main body 18 is configured so as to be insertable into the through-opening 94. In particular, the section 34 of the main body 18 having a cylindrical outer surface 36 can be configured to fit snugly into the through-opening 94. In other words, the outer diameter 68 of the cylindrical outer surface 36 of the section 34 corresponds to the inner diameter 98 of the through-opening 94.

A circumferential section 100 of the housing part 12 surrounding the through-opening 94 is received in the receiving region 50 of the connection device 1 inserted into the through-opening 94, in an embodiment form-fittingly and/or force-lockingly. This circumferential section 100 of the housing part 12 may correspond to the wall section 58 of the appliance housing 10 described above.

The circumferential section 100 may be formed by an integrally formed flange 102, as shown in FIG. 2. A circumferential insertion bevel 106 of the through-opening 94, tapering in the insertion direction 96, may be located at a distal end 104 of the flange 102. The distal end 104 of the flange 102 is, in an embodiment, located on an outside 108 of the housing part 12.

The flange 102 may extend opposite the insertion direction 96, project into the pot-shaped sealing receptacle 78, and form a sealing connection there with the at least one sealing element 72. Optionally, the flange 102 may include a circumferentially chamfered outer border 110 at its distal end 104, which facilitates slipping the at least one sealing element 72 over the flange 102.

The securing ring 60 is configured more flexibly than the housing part 12, in particular more flexibly than the flange 102. According to a further possible embodiment, the securing ring 60 can be configured to be compressible by compressing the ring gap 64. Furthermore, the securing ring 60 has the necessary geometry and material properties to withstand compression up to an outer diameter corresponding to the inner diameter 98 of the through-opening 94 without permanent plastic deformation. In other words, after such a compression, the securing ring 60 can automatically release its tension and return to its original geometry; the securing ring 60 is resilient.

Consequently, by the securing ring 60, the connection device 1 according to the invention can be fixed to the housing part 12 from the outside 108 of the housing part 12 without having to access an inside 112 of the housing part 12 opposite the outside 108. This is explained below with reference to FIGS. 5 to 7. The appliance housing 10 can be closed by the housing part 12 after installation of the appliance in the appliance housing 12, while signal transmission and/or power supply via the at least one conductor 28 of the connection device 1 is henceforth possible.

The appliance housing assembly 2, depending on the embodiment of the connection device 1, allows fixation of the connection device 1 to the housing part 12 both under two-sided accessibility and under one-sided accessibility. The term "fixation under two-sided accessibility" describes here that the connection device 1 must be accessible for fixation on an inside and an outside of the housing part 12. As long as the housing part 12 is not attached to the remaining appliance housing 10, the inside and outside of the housing part 12 are accessible, so that fixing is possible with accessibility from both sides. The term "fixation under one-sided accessibility" is intended to express that the connection device 1 only needs to be accessible from the outside of the housing part 12 for the purpose of fixation. Once the housing part 12 is attached to the remaining appliance housing 10, there is only accessibility to the outside of the housing part 12 so that only fixation under one-sided accessibility is possible. The connection device 1 can be attached to the housing part 12 and fixed by the securing element 50 under two-sided accessibility before the housing part 12 is attached to the remaining appliance housing 10.

As will be explained in more detail below, the appliance housing assembly 2 consequently creates an additional degree of freedom with respect to the order in which the connection device 1 is attached to the housing part 12 and the housing part 12 is attached to the remaining appliance housing 10.

Figure 5:
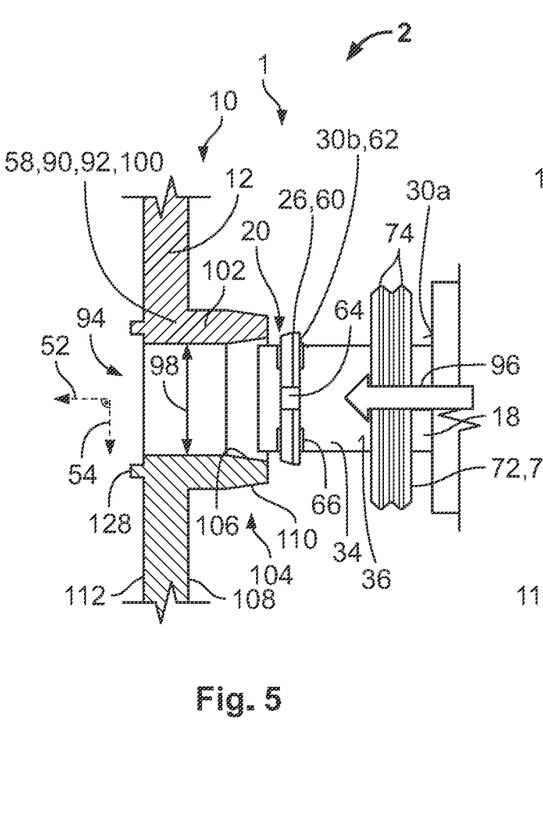
FIG. 5 is a sectional side view of a first step of an insertion process of the connection device.

During the insertion process of the connection device 1 into the through-opening 94 as indicated in FIG. 5, the securing ring 60 placed in the annular groove 66 of the main body 18 comes into contact with the insertion bevel 106. In the course of the further insertion process, the securing ring 60 is compressed due to the taper of the insertion bevel 106 when the connection device 1 is moved in the insertion direction 96 (see FIG. 6). The connection device 1 can now be pushed through the entire through-opening 94 until the appliance-side end 20 of the main body 18 together with the securing ring 60 projects from the inside 112 of the housing part 12 and the first abutment surface 30*a* abuts the outside 108 of the housing part 12. As soon as the appliance-side end 20 of the main body 18 with the annular groove 66 and the securing ring 60 leaves the through-opening 94, the securing ring 60 releases automatically so that the end face 62, which forms the second abutment surface 30*b*, abuts against the inside 112 of the housing part 12 and the connection device 1 is secured against being pulled out of the through-opening 94. The securing element 26 of the connection device 1 and the housing part 12 can form a direct snap connection; when the two components are joined, an elastic deformation of the securing element 26 is forced, which is reversed when an end position is reached by snapping the securing element into place.

The compressed state of the securing ring 60 can alternatively be achieved by manually compressing the ring gap 64 by hand and/or by using a tool. Alternatively, the securing ring 60 can be held in the compressed state by a transport lock. After inserting the compressed securing ring 60 into the through-opening 94, the transport lock is removed, leaving the securing ring 60 in the compressed state in the through-opening 94.

The housing part 12 together with the connection device 1 can then be attached to the remaining appliance housing 10. In detail, the housing part 12 can be welded to the remaining appliance housing 10, for example by laser or ultrasonic welding. Alternatively or additionally, the housing part 12 can be attached to the remaining appliance housing 10 via a snap-in, screw and/or adhesive connection. The housing part 12 can be, for example, a housing cover or a housing wall segment. In particular, the circumferential section of the housing part 12 may correspond to the wall section of the appliance housing 10 described above.

Conversely, the connection device 1 can also be attached and fixed to the housing part 12 only after the housing part 12 has been attached to the remaining housing part 10, i.e. when the appliance housing 10 is closed and accessible from one side. This has the advantage that the connection device 1 can be attached after welding, gluing or other method steps to be carried out on the appliance housing 10. Thus, the connection device 1 does not hinder those method steps or cannot be damaged by them.

In an embodiment, the securing ring 60 meets the following geometrical conditions (see FIG. 4):

In order for the securing ring 60 to be suitable for axially securing the main body 18 in position, the outer diameter 114 of the uncompressed securing ring 60 may be selected to be larger than the inner diameter 98 of the through-opening 94.

In order for the securing ring 60 to fit through the through-opening 94 in the compressed state, the outer diameter 116 of the compressed securing ring 60 can be configured smaller than the inner diameter 98 of the through-opening 94. For this purpose, it is advisable to make the ring gap 64 of the securing ring 60 at least larger than the product of the circular number 7C and the difference between the outer diameter 114 of the uncompressed securing ring 60 and the inner diameter 98 of the through-opening 94. The ring gap 64 is present in a force-free state of the securing ring 60 and the securing ring 60 is spreadable by widening the ring gap 64.

To ensure that the securing ring 60 can be sufficiently compressed in the annular groove 66, the inner diameter 118 of the compressed securing ring 60 can be selected to be greater than or equal to the groove diameter 120.

To ensure that the securing ring 60 is held undetachably in the annular groove 66, the inner diameter 122 of the uncompressed securing ring 60 may be selected to be smaller than the sum of the groove diameter 120 and twice the groove depth 124.

In addition to the insertion bevel 106 of the through-opening 94, the securing ring 60 may have a circumferentially chamfered outer edge 126 facing away from the second abutment surface 30*b* (see FIG. 4). The chamfered outer edge 126 faces the appliance-side end 120 of the main body 18 and faces away from the first abutment surface 30*a*. Instead of a chamfer, the insertion bevel 106 of the through-opening 94 and/or the outer edge of the securing ring 60 can also have a circumferential rounding.

Optionally, an elastic, annular element, for example made of rubber or foam, can be arranged in the annular groove 66 between the securing ring 60 and the main body 18, which holds the securing ring 60 against the force of gravity and centers it with respect to the annular groove 66. The term "elastic" here describes the material property of the ring-shaped element, which can be deformed at least more easily than the securing ring itself. However, the ring-shaped element does not deform under the securing ring's own weight.

Figure 7:
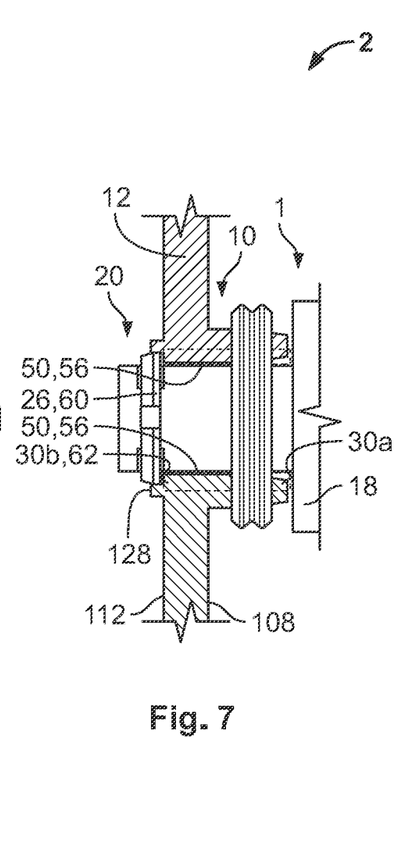
FIG. 7 is a sectional side view of the connection device fully inserted into a housing part of the appliance housing assembly.

Alternatively or additionally to the elastic, ring-shaped element, an annular pedestal 128 may be formed on the inside 112 of the housing part 12, which surrounds the securing ring 60 and on which the securing ring 60 is supported for centering purposes (see FIG. 7).

According to an alternative embodiment shown in FIG. 8, the securing element 26 can also be formed in one piece with the main body 18. For this purpose, the securing element 26 can be formed by a locking latch 160 or by a plurality of locking latches 160. In the embodiment shown, the securing element 26 is exemplarily formed by three locking latches 160. However, only one locking latch 160, two locking latches 160, or four or more locking latches 160 can also be provided.

The locking latches 160 extend parallel to one another and are distributed along the cylindrical outer surface 36 at regular or irregular angular intervals around the central projection 38 of the main body 18. Each locking latch 160 is formed as a rod-shaped or a beam-shaped projection 162 facing the appliance-side end 20 of the main body 18 with a step-shaped or a hook-shaped end section 164, wherein the end section 164 comprises a respective section 166 of the second abutment surface 30*b*. Furthermore, the respective end section 164 may comprise a part of the chamfered outer edge 126. The beam-shaped projection 162 is each cantileveredly formed on the main body 18 and is flexible in the radial direction 54. The end section 164 can be integrally formed on the main body 18 in a cantilevered manner and be flexible in a radial direction.

Alternatively, the securing element 26 can also be a separate component that can be attached to the main body 18. For this purpose, the securing element 26 can be attached to the appliance-side end 20 of the main body 18. Accordingly, the securing element 26 can comprise the second abutment surface 30*b* when attached to the main body 18. Furthermore, the securing element 26 can be detachable from the main body 18 in a non-destructive manner. Optionally, the securing element 26 can be repeatedly attachable and detachable. For this purpose, the main body 18 and securing element 26 can, for example, form a direct spreading connection.

Figure 6:
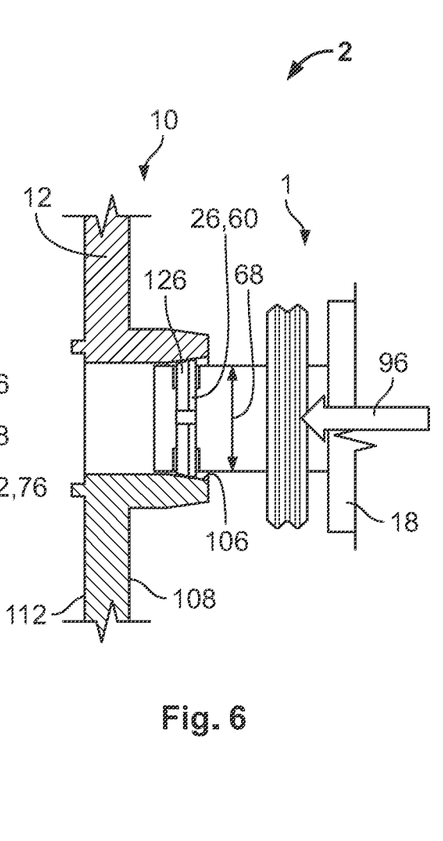
FIG. 6 is a sectional side view of a second step of the insertion process of the connection device.

Analogously to the processes already explained with respect to FIGS. 5 to 7, the beam-shaped projections 162 are each depressed inwardly in the radial direction 54 during the insertion of the connection device 1 and pass through the through-opening 94. As soon as the hook-shaped end sections 164 leave the through-opening 94, the beam-shaped projections 162 independently return to their original shape so that the parts 166 of the second abutment surface 30b respectively abut against the inside 112 of the housing part 10 and secure the connection device 1 against being pulled out of the through-opening 94.

The connection device 1 can be configured to rotate relative to the housing part 12. In an embodiment, there is a relative rotatability of up to 360° or an integer multiple of 360°. This is indicated in FIG. 3 by the dashed arrow 130 and, above all, facilitates the installation of the sensor arrangement 4 according to the invention, which is described in more detail below. The outer contour 32 improves the relative rotatability between the connection device 1 and the appliance housing 10, wherein the relative rotatability is about an axis of rotation of the rotationally symmetrical outer contour 32. This embodiment improves the relative rotatability between the connection device 1 and the appliance housing 10, for example when the main body 18 is inserted at its section with a cylindrical outer surface 36 through a circular through-opening 94 in the wall section 58 of the appliance housing 10 and is secured on the other side via the securing element 26 against being pulled out in the axial direction, wherein the axial direction here refers to the cylindrical outer surface 36 of the section of the main body 18.

In the sensor arrangement 4 according to the invention, the at least one conductor 28 of the connection device 1 is connected to the circuit board 16 of the sensor 14. The sensor arrangement shown in FIG. 3 comprises here an automotive sensor 132, in particular a rearview mirror camera 134 for a motor vehicle. Advantageously, the rearview mirror camera 134 in this embodiment can be used equally as a left or right rearview mirror camera by rotating the connection device 1. The appliance-side end 20 of the main body 18 can consequently represent a sensor-side end 44 and/or a camera-side end 46.

The present invention also relates to a pair of rearview mirror cameras 134 for a motor vehicle comprising a set of two connection devices 1 and a first rearview mirror camera 134 and a second rearview mirror camera 134, wherein the two connection devices 1 are configured to be interchangeable between the first and second rearview mirror cameras 134. That is, the two connection devices 1 can be used equally for the first and second rearview mirror cameras 134.

The at least one conductor 28 may be both an electrical conductor 136 and an optical conductor. The at least one conductor 28 may be made of copper, bronze, brass, or other electrically conductive materials, for example. In this regard, the at least one conductor 28 may be a turned part, a cast part, and/or a stamped-bent part.

As shown in FIG. 1, the receiving region 50 can surround the at least one conductor 28 circumferentially. For this purpose, the first abutment surface 30a, the second abutment surface 30b and/or the cylindrical outer surface 36 can radially surround the at least one conductor 28 at least in sections. In particular, the at least one conductor 28 can pass through the securing element 26 (see FIGS. 1 and 3) and run coaxially with the cylindrical outer surface 36 at least at the appliance-side end 20 of the main body 18. Furthermore, the at least one conductor 28 can lead through the securing ring 60. Thus, the course of the at least one conductor 28 is not obstructed.

The conduit 24 may also extend coaxially with the cylindrical outer surface 36, at least at the appliance-side end 20 of the main body 18. Accordingly, the at least one conductor 28 may pass through the conduit 24, as shown in FIGS. 1 and 3. For this purpose, the conduit 24 can be configured as a passage 138 which leads through the main body 18 and links the appliance-side end 20 to the connection-side end 22.

In the exemplary embodiments shown in FIGS. 1 to 3, the connection device 1 comprises two electrical conductors 136, which extend coaxially with respect to each other as inner conductor 140 and outer conductor 142 and are electrically insulated by a dielectric 144 (e.g., made of LCP).

At the appliance-side end 20 of the main body 18, the at least one conductor 28 can be accessible for a rotatable connecting member 146 and connected to the circuit board 16 of the sensor 14 via the latter. In the exemplary embodiment shown in FIG. 3, the rotatable connecting member 146 comprises a printed circuit board connector 148 with two rotationally symmetrically shaped contacts 150, respectively. In particular, the inner conductor 140 is connected to the circuit board 16 of the sensor 14 via a first sleeve-shaped contact 150a of the circuit board connector 148. The outer conductor 142 is connected to the circuit board 16 of the sensor 14 via a second sleeve-shaped contact 150b of the circuit board connector 148. The connecting member 146 may be, for example, an electrically conductive contact spring, a printed circuit board connector with tolerance compensation function, an optical coupler, or an optoelectrical or electrooptical transducer. If the electrically conductive contact spring mentioned above is used as a connecting member 146, it can be configured in a C-shape or any other geometric shape. The contacts 150 are arranged in alignment with each other in the insertion direction so that no normal force is exerted on the circuit board 16 of the sensor 14 during and after the contacts 150 are plugged together. Furthermore, the board-side contact is aligned with the through-opening 94 of the housing part 12 in the insertion direction. The resulting relative rotatability simplifies the installation of the sensor arrangement 4 according to the invention.

At the connection-side end 22 of the main body 18, the at least one conductor 28 can be accessible for a plug connector. For this purpose, in the exemplary embodiment shown in FIG. 3, a plug-in face 152 is formed at the connection-side end 22 of the main body 18, into which the conduit 24 opens and inner conductor 140 and outer conductor 142 project.

Alternatively, the at least one conductor 28 can be connected to the cable 6 at the connection-side end 22 of the main body 18 via a crimp connection 154. Accordingly, the connection device 1 according to the invention can comprise a crimp cable lug 155 for the inner conductor 140 and the outer conductor 142, respectively. The inner conductor 140 may be connected to a core 156 of the cable 6 via its crimp cable lug 155, while the outer conductor 142 can have a sleeve-shaped section connected to a shield 158 of the cable 6 via its crimp cable lug 155. This is illustrated in FIG. 1. In various embodiments, the electrical cable 6 is electrically conductively connected to the at least one conductor 28 at the connection-side end 22 of the main body 18 via a permanent connection, such as a crimped, soldered or welded connection, or via a detachable connection, such as a plug-in connection.

The present invention is advantageous, firstly, because the receiving region 50 is clearly defined by the first and second abutment surfaces 30a, 30b. Thus, the clamping reception of the wall section 58 in the receiving region 50 during the attachment of the connection device 1 to the appliance housing 10 is comparatively simple. This facilitates the corresponding work processes during appliance manufacture, in particular during assembly and fixing of the connection device 1 to the appliance housing 10. Thereafter, signal transmission and/or power supply can take place via the at least one conductor 28.

Secondly, the possibility of clamping the wall section 58 in the receiving region 50 allows the wall section 58 to be clamped, enclosed, wedged or otherwise form-fittingly and/or force-lockingly received between the first and second abutment surfaces 30a, 30b so that the connection device 1 and the appliance housing 10 are not displaceable relative to one another in at least one direction, while a relative rotatability between the connection device 1 and the appliance housing 10 can remain. This facilitates appliance installation and use due to the increased flexibility with respect to the alignment of the connection device 1 relative to the appliance housing 10.

What is claimed is:

1. A connection device for an appliance with an appliance housing, the connection device comprising:
   a main body having an appliance-side end, a connection-side end facing away from the appliance-side end, and a conduit extending from the appliance-side end to the connection-side end, the main body has a first abutment surface facing the appliance-side end;
   a securing element securing the main body to a wall section of the appliance housing, the securing element is separate from and attachable to the main body, the securing element has a second abutment surface facing the first abutment surface, the first abutment surface and the second abutment surface enclose therebetween a receiving region for clamping reception of the wall section of the appliance housing; and
   a conductor leading through the main body from the connection-side end to the appliance-side end.

2. The connection device of claim 1, wherein the main body has a section with a cylindrical outer surface between the appliance-side end and the connection-side end.

3. The connection device of claim 1, wherein the receiving region surrounds the conductor.

4. The connection device of claim 1, wherein the conductor is accessible at the appliance-side end of the main body and/or at the connection-side end of the main body.

5. The connection device of claim 1, wherein the securing element is a securing ring.

6. The connection device of claim 5, wherein the securing ring has a ring gap and is compressible.

7. The connection device of claim 1, further comprising a sealing element abutting against the main body.

8. The connection device of claim 7, wherein the main body has a central projection forming the conduit and a pot-shaped sealing receptacle surrounding the central projection.

9. The connection device of claim 8, wherein the pot-shaped sealing receptacle is open toward the appliance-side end.

10. The connection device of claim 9, wherein the sealing element is arranged in the pot-shaped sealing receptacle.

11. The connection device of claim 10, wherein the sealing element projects into the receiving region.

12. The connection device of claim 1, wherein there is an angular offset of 90° between the appliance-side end and the connection-side end of the main body.

13. An appliance housing assembly, comprising:
   an appliance housing having a housing part in which an appliance is installable, the housing part having a through-opening; and
   a connection device insertable into the through-opening along an insertion direction, the connection device including a main body having an appliance-side end, a connection-side end facing away from the appliance-side end, and a conduit extending from the appliance-side end to the connection-side end, the main body has a central projection forming the conduit and a pot-shaped sealing receptacle surrounding the central projection, a securing element securing the main body to a wall section of the appliance housing, a conductor leading through the main body from the connection-side end to the appliance-side end, and a sealing element arranged in the pot-shaped sealing receptacle, the sealing element abuts against the main body, the main body has a first abutment surface facing the appliance-side end, the securing element has a second abutment surface facing the first abutment surface, the first abutment surface and the second abutment surface enclose therebetween a receiving region for clamping reception of the wall section of the appliance housing, a circumferential section of the housing part surrounding the through-opening is received in the receiving region.

14. The appliance housing assembly of claim 13, wherein the through-opening has an insertion bevel tapering in the insertion direction.

15. The appliance housing assembly of claim 13, wherein the connection device is rotatable relative to the housing part.

16. A sensor assembly, comprising:
   an appliance housing assembly including:
      an appliance housing having a housing part in which an appliance is installable, the housing part having a through-opening; and
      a connection device insertable into the through-opening along an insertion direction, the connection device including a main body having an appliance-side end, a connection-side end facing away from the appliance-side end, and a conduit extending from the appliance-side end to the connection-side end, the main body has a central projection forming the conduit and a pot-shaped sealing receptacle surrounding the central projection, a securing element securing the main body to a wall section of the appliance housing, a conductor leading through the main body from the connection-side end to the appliance-side end, and a sealing element arranged in the pot-shaped sealing receptacle, the sealing element abuts against the main body, the main body has a first abutment surface facing the appliance-side end, the securing element has a second abutment surface facing the first abutment surface, the first abutment surface and the second abutment surface enclose therebetween a receiving region for clamping reception of the wall section of the appliance housing, a circumferential section of the housing part surrounding the through-opening is received in the receiving region; and
   a sensor having a circuit board, the conductor is connected to the circuit board.

17. The sensor assembly of claim 16, wherein the sensor is a rearview mirror camera for a motor vehicle.

\* \* \* \* \*